United States Patent [19]
Yin

[11] Patent Number: 6,028,939
[45] Date of Patent: Feb. 22, 2000

[54] DATA SECURITY SYSTEM AND METHOD

[75] Inventor: John Yin, Fremont, Calif.

[73] Assignee: RedCreek Communications, Inc., Newark, Calif.

[21] Appl. No.: 08/778,535

[22] Filed: Jan. 3, 1997

[51] Int. Cl.[7] .................................. H04L 9/00; H04L 9/06
[52] U.S. Cl. ................................ 380/49; 380/9; 380/28; 380/29; 380/37; 380/43
[58] Field of Search .................................. 380/9, 28, 29, 380/33, 37, 43, 21, 30, 4, 49, 50

[56] References Cited

U.S. PATENT DOCUMENTS

| | | | |
|---|---|---|---|
| 4,157,454 | 6/1979 | Becker | 380/37 |
| 4,543,646 | 9/1985 | Ambrosius, III et al. | 380/29 |
| 5,533,123 | 7/1996 | Force et al. | 380/4 |

Primary Examiner—Bernarr E. Gregory
Attorney, Agent, or Firm—Gray Cary Ware & Freidenrich LLP

[57] ABSTRACT

A data security system and method for providing a cryptographic process such as the Data Encryption Standard comprises a microprocessor having a programmable hardware element such as a field programmable gate array interfaced to the processor bus. The predetermined ordered sequence of operations which form the cryptographic process are parsed into hardware-centric operations such as bit manipulations, table look-ups and logic operations which are efficiently performed in hardware, and into software-centric operations such as data processing and state machine control. Hardware-centric operations are performed in the programmable hardware device, and overall control of the system is performed under microprocessor control.

20 Claims, 9 Drawing Sheets

DATA SECURITY SYSTEM AND METHOD

BACKGROUND OF THE INVENTION

This invention relates generally to data security, and more particularly to cryptographic systems and methods for securing data transmissions over a communications network.

Enterprises which communicate data either internally between enterprise locations or externally with other entities are increasingly facing the need to secure their data, both to protect the privacy of the communications, as well to ensure its integrity. This is true even of companies with private data communications networks, since increasingly such networks rely upon leased communication lines from telecommunication providers, such as the telephone companies. Even dedicated leased lines must pass through central routing and switching systems where the company leasing the line has no control over access to the line. With today's digital infrastructure, there is no longer the concept of a physical leased line from endpoint to endpoint. All wide area traffic is multiplexed and demultiplexed by the central office (telephone company) and other carriers. Therefore, the physical access to the "leased line" is no longer necessary since the digital switches at the central offices can be programmed to wiretap any circuit. Moreover, many wideband communication lines such as T1 or T3 lines are transmitted by radio frequency, and are subject to intercept.

With the advent of the Internet and the ease with which the communications may be established over wide geographical areas, many companies which previously did not interconnect their facilities are now finding it convenient to do so. Moreover, many companies communicate with others via e-mail. Accordingly, there is an increasing need for cost-effective and scaleable data security products to satisfy the needs of a broad range of users from the individual consumer to the large corporation.

There are a number of cryptographic and other privacy systems available which may be used for securing data. These include symmetrical cryptographic systems, such as the National Bureau of Standards Data Encryption Standard (DES), also known as the Data Encryption Algorithm (DEA), which is very useful within a given organization where all the parties communicating have the same cryptographic key. Privacy systems also include public key cryptographic systems which enable private communications between parties who do not each possess the same cryptographic key. Public key cryptography systems are also useful for authenticating the identity of the parties communicating.

Current approaches to data security isolate the cryptography process into a particular system element, generally either in hardware or in software. Occasionally, a combination of hardware and software may be employed for implementing different security functions, the implementation depending upon whether the cryptographic function is for data encryption or for data authentication. Many high-end products employ a hardware-based encryption engine. It may be a separate semiconductor chip, such as a DES chip implementing a complete DEA function, or in firmware in a dedicated processor. Low-end products typically implement the encryption engine in software. Hardware solutions usually require specialized off-the-shelf chips or custom ASICs (Application Specific Integrated Circuits) which implement the complete data encryption process. The hardware is generally a "black box" which is responsible for all aspects of data encryption. The processor in which the ASIC device is used loads in a key, sets the mode of operation, and passes the data through the encryption device in either programmed I/O mode or by Direct Access Memory (DMA). The device must also incorporate a bus interface in order to interface with the processor. Such hardware approaches, while offering higher performance than software, have a number of disadvantages. They are more costly than software, and they are inflexible. Once a particular encryption algorithm is implemented in hardware, it cannot be changed. Custom ASICs are expensive and have long lead times. They are not scaleable, and once designed, faster and slower parts all have the same cost. Moreover, current hardware devices cannot be upgraded with improved encryption technology which may be developed.

Software solutions generally implement the entire data security function in a general purpose processor, such as, for example, an Intel Pentium processor. The processor is responsible for performing all of the encryption process under the control of software, and it behaves as the functional equivalent of a dedicated hardware device. Although software implementations have the advantage of low cost and flexibility, they suffer from poor performance, and are not useful for processing high data rate communications. With a typical mid-range RISC processor having a processing power of the order of 30 MIPS, typical maximum data encryption/decryption rates are of the order of only a few megabits per second (Mbps). A high end Intel Pentium processor operating at 133 MHz can sustain approximately 10 Mbps of DES encryption using software. While those rates are acceptable, its actual use in data communication devices is problematic since the processor can perform no other useful work at these rates of data encryption. Since higher performance processors are more expensive than ASICs, the cost of this system, is at least several orders of magnitude higher. If an enterprise requires 10 Mbps performance, it is impractical to implement this capability in software only.

There is, accordingly, a need for high performance data security systems and methods which provide high performance with a cost-effective and scaleable architecture, the adaptability to incorporate new or different algorithms and processes, as well as the flexibility to satisfy the needs of multiple types of users. This invention is directed to satisfying this need.

SUMMARY OF THE INVENTION

The invention affords flexible and adaptable high performance data security systems and methods which provide cost effective and scaleable solutions to a wide range of data security problems. Systems and methods in accordance with the invention have substantially lower cost for equivalent performance and substantially enhanced flexibility over known systems and methods. They are applicable to both conventional symmetric cryptographic systems and processes, such as DES, as well as to asymmetric public key cryptographic systems for key exchange, authentication and digital signatures. Moreover, the invention enables other processes and functionality, such as data compression, for example, to be conveniently incorporated with data security technology in a highly flexible and advantageous manner.

In one aspect, the invention provides a data security system and method for performing a cryptographic process on data which comprises a predetermined ordered sequence of operations, including data movement, bit manipulation, substitution and logical operations. The cryptographic process is performed using a system which comprises a microprocessor and a hardware device with a plurality of functional elements which are configurable to perform predetermined functions. The method comprises configuring the functional elements in the hardware device to perform sequences of the data movement, bit manipulation, substitution and logical operations, which correspond to sequences in the cryptographic process, and the microprocessor for controlling the operation of the hardware device in accordance with the predetermined ordered sequence of operations in order to perform the cryptographic process on data.

In accordance with another aspect, the invention comprises a data security system and method for performing a cryptographic process on data using a microprocessor and a programmable hardware device which has a plurality of functional elements that are configurable under program control to perform predetermined functions. The cryptographic process, which comprises a predetermined ordered sequence of operations, is parsed into hardware-centric operations and software-centric operations. The hardware-centric operations are allocated to the programmable hardware device, and the software-centric operations are allocated to the microprocessor. The sequence of operations performed by the microprocessor and by the programmable hardware element are controlled in order to provide the predetermined ordered sequence of operations corresponding to the cryptographic process.

DETAILED DESCRIPTION OF PREFERRED EMBODIMENTS

The present invention is particularly well adapted to a data security system and method which employs a block cipher cryptographic algorithm such as the Data Encryption Algorithm (DEA) known as the Data Encryption Standard (DES) for encrypting and decrypting data, as well as to public key cryptographic systems, and will be described in that context. It will be appreciated, however, that the invention has greater utility, and that it may be employed, for example, with other bulk encryption systems such as IDEA, or stream cipher systems, as well as for other types of data processing operations such as compression.

Figure 1:
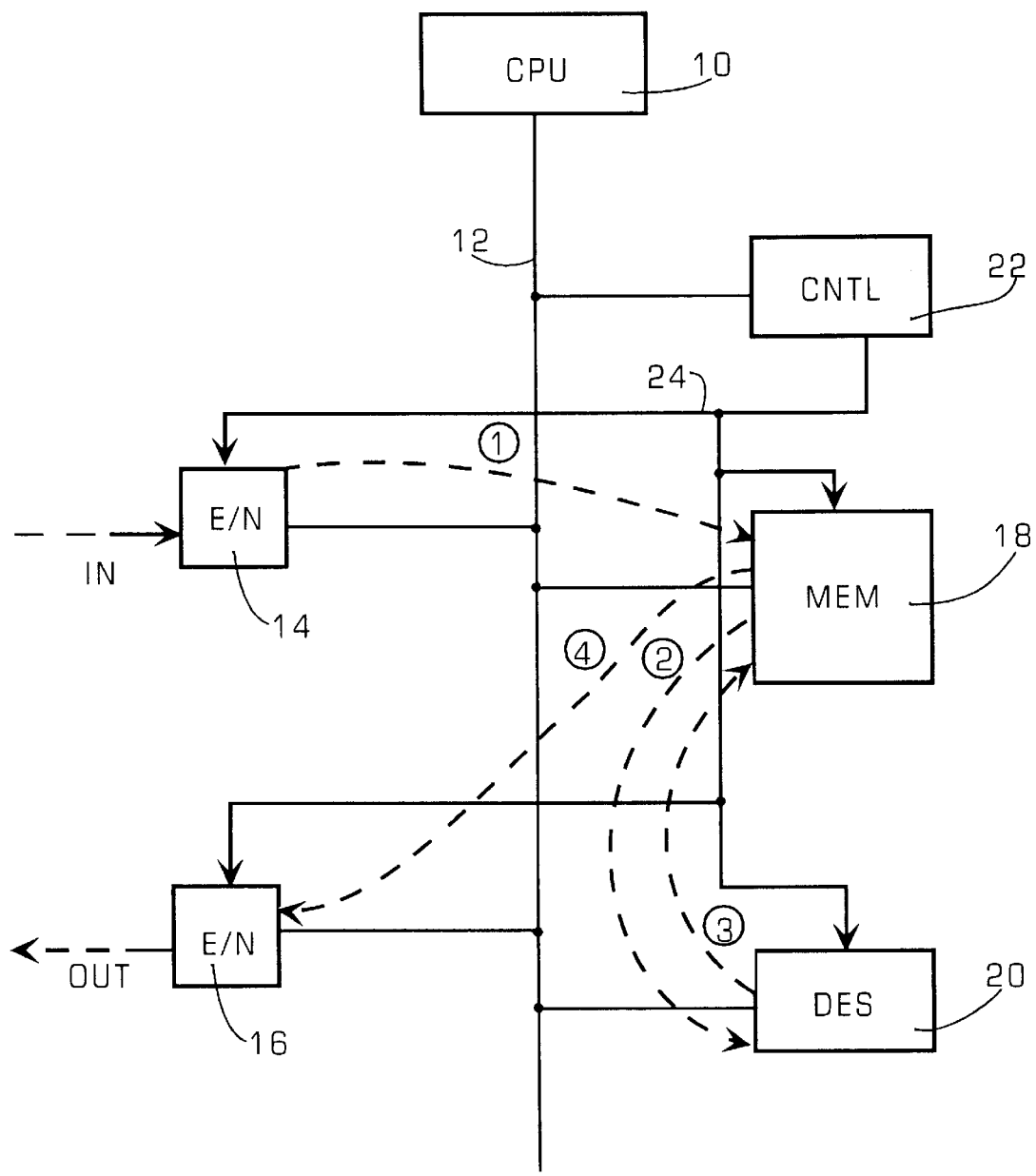
FIG. 1 is a block diagram of a data security system for encryption and decryption employing a conventional DES semiconductor chip.

FIG. 1 illustrates a conventional data processing system for duplex communications over a data communications network which incorporates a hardware data security device. As shown, the system may comprise a central processing unit (CPU) 10 having a data bus 12 over which data may be received from and transmitted to a network by first and second input/output devices such as ethernet (E/N) adapters 14 and 16. A memory 18 may also be connected to data bus 12, and may comprise both non-volatile memory for storing the processor operating system and application programs, as well as random access memory (RAM) for the temporary storage of data during processing operations. A special purpose hardware DES device 20 may also be connected to the bus, and may comprise either a standard DES chip or a custom ASIC device constructed to perform the DES process. As will be described shortly, the DES device is a hardware implementation of the DEA algorithm which performs encryption and decryption of data on data bus 12. Also connected to the data bus is control logic 22, which may be referred to as "glue logic," and which provides interface logic for matching one device to another and for controlling via a control bus 24 the ethernet input/output devices, the memory, and the DES device. The system of FIG. 1 may also include other input/output (I/O) devices, not shown, such as a keyboard interface, a monitor interface, and an interface to a hard disk.

DES device 20 may comprise a DES semiconductor chip, such as Model CA95C68/18/09, commercially available from Newbridge Microsystems, Ontario, Canada, or a custom ASIC which implements in hardware the functions required for encrypting and decrypting data according to the DES algorithm, as will be explained in more detail shortly. Available standard DES chips are 8-bit devices and have a generic processor bus interface. Otherwise, they must be used with a secondary interface device in order to interface the chip to the bus. The DES data security function could also be provided in the system of FIG. 1 by software stored in memory 18, for example, which controls CPU 10 without the use of the DES chip. This effectively converts the CPU general processor to a special purpose data encryption and decryption device. Although the hardware implementation using the DES chip 20 illustrated in FIG. 1 has substantially higher performance than a software embodiment, the hardware implementation has the disadvantage of being substantially more expensive and inflexible since once the algorithm is embodied into the chip it cannot be later changed.

Even though the hardware arrangement for data security illustrated in FIG. 1 has higher performance than a software implementation, it nevertheless is incapable of taking full advantage of either the speed of the CPU 10 or of the hardware DES chip 20. This can be illustrated, as shown in FIG. 1, by the sequence of transfers necessary for reading data into and out of the system. As shown, data into the system enters ethernet device 14. A first data transfer, illustrated in dashed lines and labeled as the numeral 1 in a circle, transfers the data from the ethernet device to memory 18. Next, a second transfer must occur between the memory 18 and the DES chip 20 to enable the data to be processed. The DES chip processes the data and returns it to memory 18 as a third bus transfer. Finally, the data is output to ethernet device 16 by a fourth transfer. Therefore, at best the effective data rate which the system of FIG. 1 can handle is one-fourth of the data rate of bus 12, since four transfers are required for each I/O data transfer. In reality, the effective rate is substantially less due to the processing time required for encryption and decryption of data. Moreover, since the DES chip is generally a standard 8-bit chip, and not optimized to any particular CPU, the chip can not take advantage of some of the capabilities of newer microprocessors, such as bursting or synchronous data transfer, and the overall operation of the system is not optimized.

As will be described shortly, the invention provides a system and method which overcome the foregoing disadvantages by enabling a cost-effective, scaleable and high performance implementation of data security. Prior to describing the invention, however, it will be helpful to its understanding to first present a description of the DES encryption and decryption algorithm.

Figure 2A:
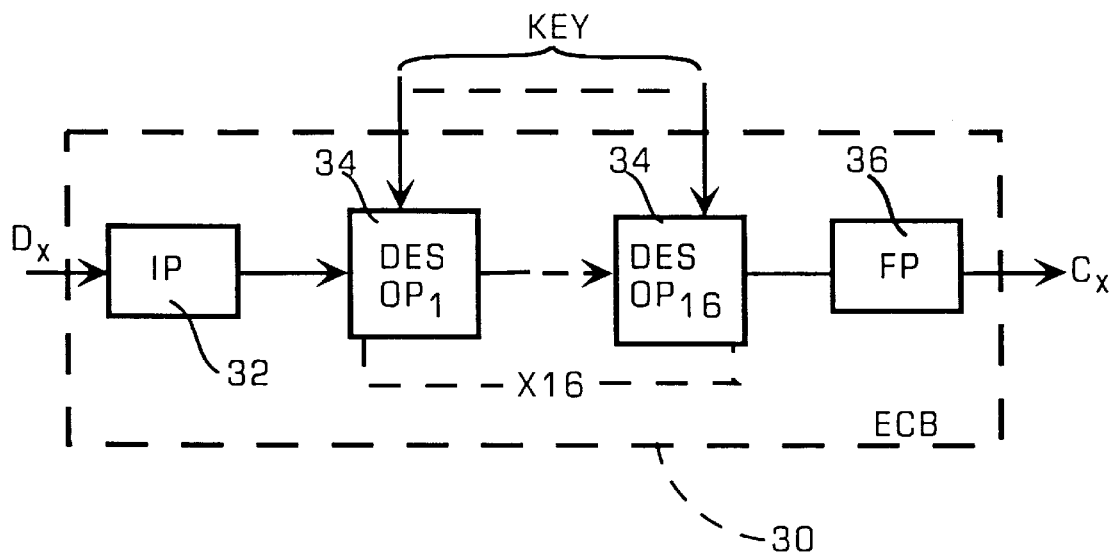
FIGS. 2A–B are block diagrams illustrating, respectively, the electronic code book (ECB) and cipher block chaining (CBC) block cipher encryption modes of DES.

DES is a block cipher system which operates on blocks of 64 bits of data in parallel using confusion and diffusion for obscuring redundancies in a plaintext message. It is a symmetrical system, using the same algorithm and key for both encryption and decryption. The key is 56 bits. Block encryption systems have several different modes of operation. The primary mode, which is used as a building block for the other modes, is illustrated in FIG. 2A and referred to as the Electronic Code Book (ECB). As shown, it converts plaintext data, $D_x$, to ciphertext, $C_x$ under the control of the 56-bit key. For DES block cipher systems, the plaintext $D_x$ is first subjected to an initial permutation (IP) 32 which, as will be described shortly, diffuses or permutes the 64 bits in the input block into a different order. The permuted bits are then operated on by a first DES operation 34. This operation, which comprises a confusion or substitution operation and a permutation operation as will be described in more detail shortly, is repeated for 16 rounds as indicated in the figure. The output of the 16th DES round is subjected to a final permutation (FP) 36, and the output forms the block of ciphertext, $C_x$.

Figure 2B:
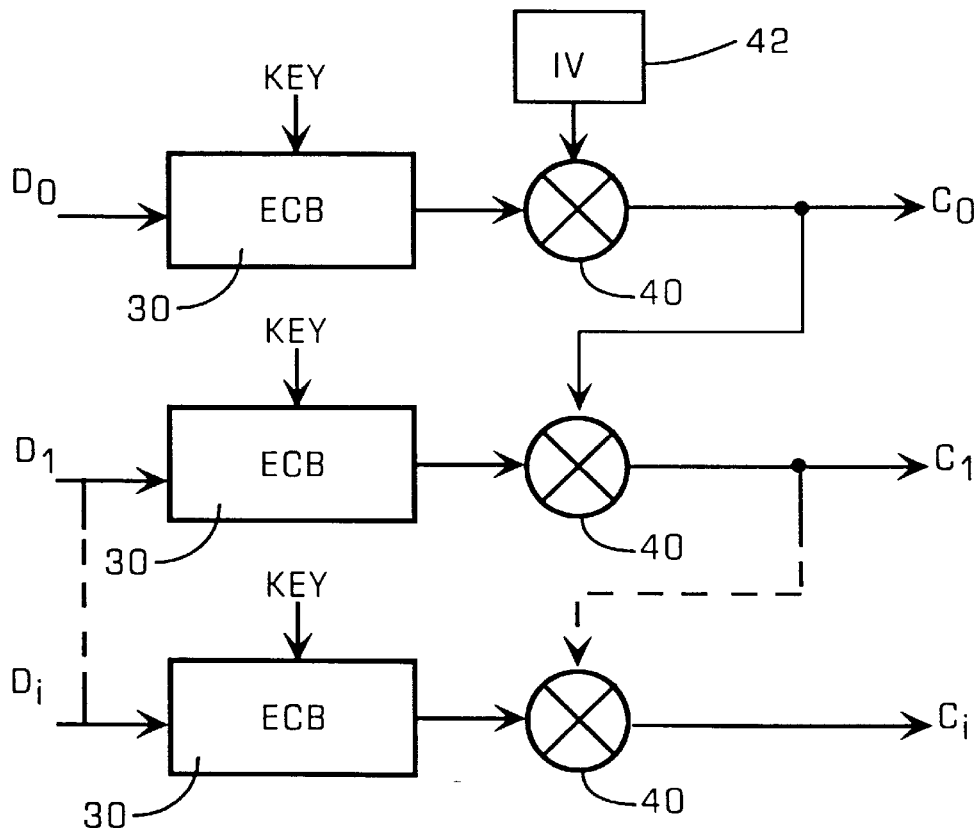

In order to afford greater security, the ECB mode may be used as the basic operation in a second cryptographic mode known as cipher block chaining (CBC) which is illustrated in FIG. 2B. As shown, in CBC, the ciphertext block resulting from a first ECB operation 30 is exclusive OR'ed in an exclusive OR (XOR) logic device 40 with a 64-bit initial vector (IV) 42 to produce a cipher block $C_0$. The next input block $D_1$ is subjected to an ECB operation and the output is exclusive OR'ed in an XOR logic device 40 with the cipher block $C_0$ to produce a second cipher block $C_1$. This process is repeated with each successive input block, with each block $D_i$ being exclusive OR'ed with the cipher block $C_{i-1}$ to produce a block of ciphertext $C_i$.

Another cryptographic mode which could be employed is a cipher feedback (CFB) mode, not illustrated, in which the input to the first ECB operation is an initialization vector, and the first block of plaintext data is exclusive OR'ed with the output of the ECB operation to produce a block of ciphered text which is used as the input to the next stage. Other operating modes may also be used.

Figure 3:
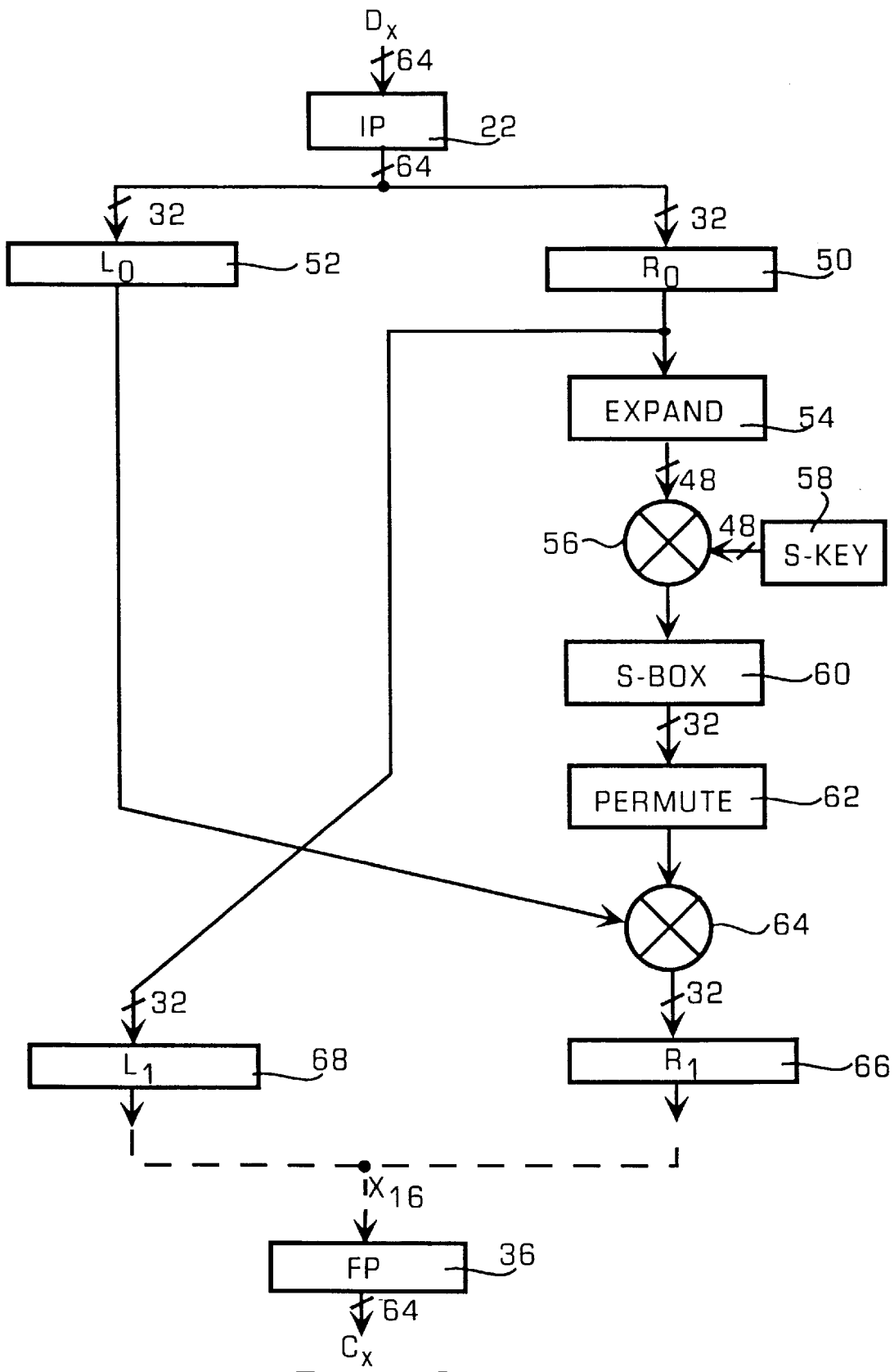
FIG. 3 is a block diagram illustrating in more detail a portion of a DES operation.

FIG. 3 illustrates in more detail the DES operation 34 of FIG. 2A. As shown, DES operates on a 64-bit block of plaintext ($D_x$) which is the input to the initial permutation (IP) 32. The output from the IP 32 is a 64-bit block of data which is split into two 32-bit blocks, a right half, $R_0$, 50 and a left half, $L_0$, 52. This partitioning of the input block of data may be accomplished simply by dividing the input block into two parts. The right half block of 32 bits is expanded (as will be described below) in an expander 54 to produce a 48-bit block. This 48-bit block is then combined in an exclusive OR (XOR) 56 with a 48-bit DES sub-key (S-key) 58. DES employs a 56-bit key, which is utilized to derive 16 48-bit sub-keys for each of the 16 DES rounds which form the overall DES ECB mode. The sub-keys are generated by first dividing the 56-bit key into two parts, rotating the two parts in a predetermined manner by either one or two bits depending upon the particular DES round, and then subjecting them to a compression and permuting operation to produce a 48-bit sub-key. The two rotated halves of the input key from the first round are the input key to the second round, where the rotation, compression and permuting operation is repeated to produce the second round sub-key. This operation is repeated for each of the 16 rounds of the DES ECB operation.

The 48-bit output from XOR 56 is then subjected to a substitution operation in eight S-boxes 60 (to be described below) to produce a 32-bit block of data. This data is then permuted by a permutation device 62 and exclusive OR'ed in an XOR 64 with the left half 52 of the input block. This produces a 32-bit output which forms the new right half $R_1$ 66 to the second round of DES. The left half, $L_1$, 68 of the second round comprises the right half $R_0$ of the first round, as shown. The operation is then repeated 16 times and then subjected to the final permutation (FP) 36 to produce the 64-bit block of ciphertext ($C_x$).

Figure 4:
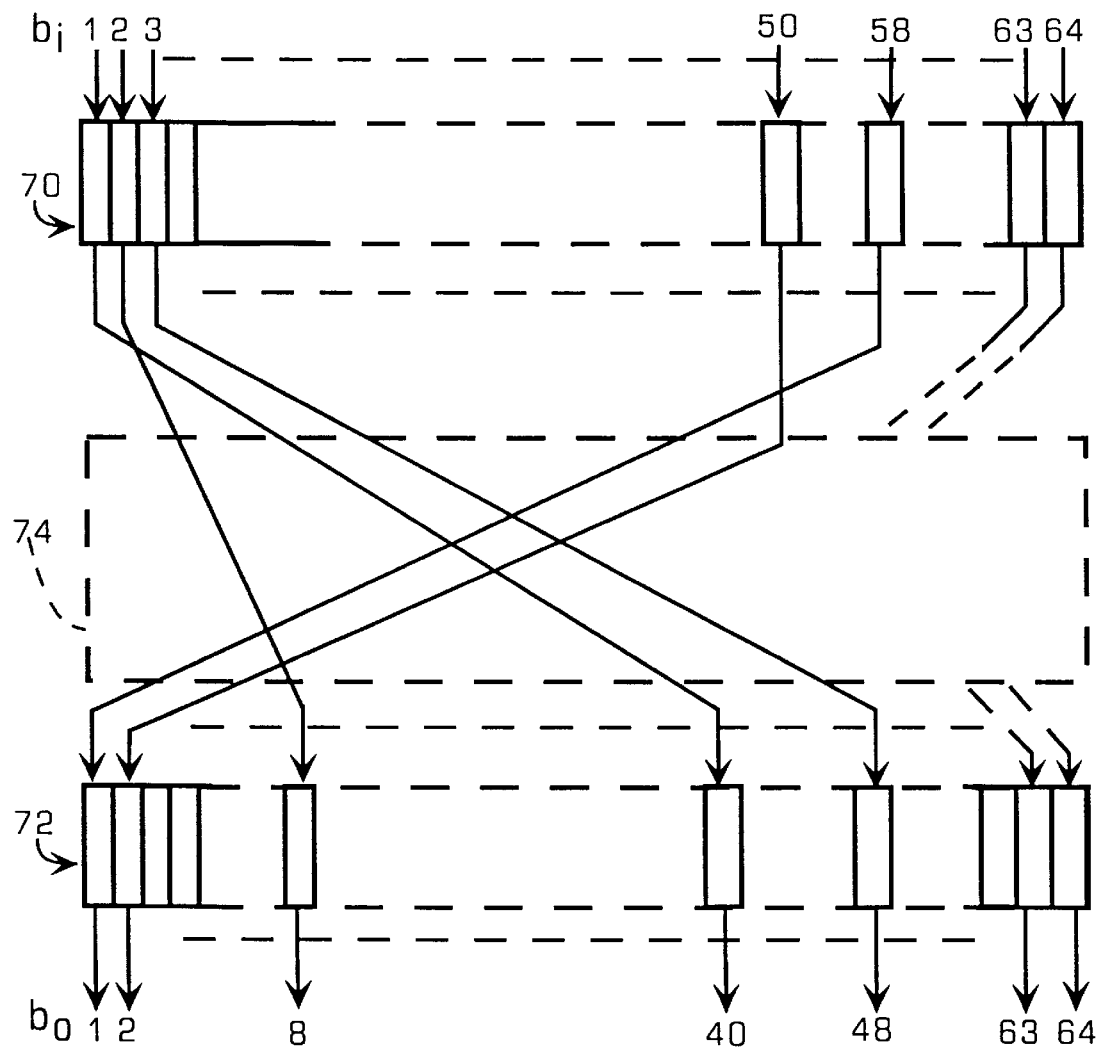
FIG. 4 is a diagrammatic view illustrating the initial permutation of DES.

The initial permutation (IP) is illustrated in FIG. 4. The 64 bits of data which comprise the input block are supplied to the IP stage where they are transposed bit-wise, i.e., diffused, to produce a different output sequence of 64 bits. This may be accomplished, for example, by reading the 64 input bits into a 64-stage register 70. The output of each stage may be hardwired to a predetermined one of 64 stages of an output register 72. The interconnection between the input register stages and the output register stages comprises a permutation or transposition matrix 74 formed by the hardwiring between registers. The particular manner in which the input bits are permutted is defined by the DES standard. For example, the DES standard specifies that input bit 1 is transposed to output bit 40, input bit 2 is transposed to output bit 8, input bit 3 is transposed to output bit 48, etc., as illustrated in FIG. 4. Output bit 1 is taken to be input bit 58, output bit 2 is derived from input bit 50, etc. Since the permutation 74 specified by the DES standard is fixed, the bit transposition operation of the initial permutation may be performed by hardwired hardware devices.

Figure 5:
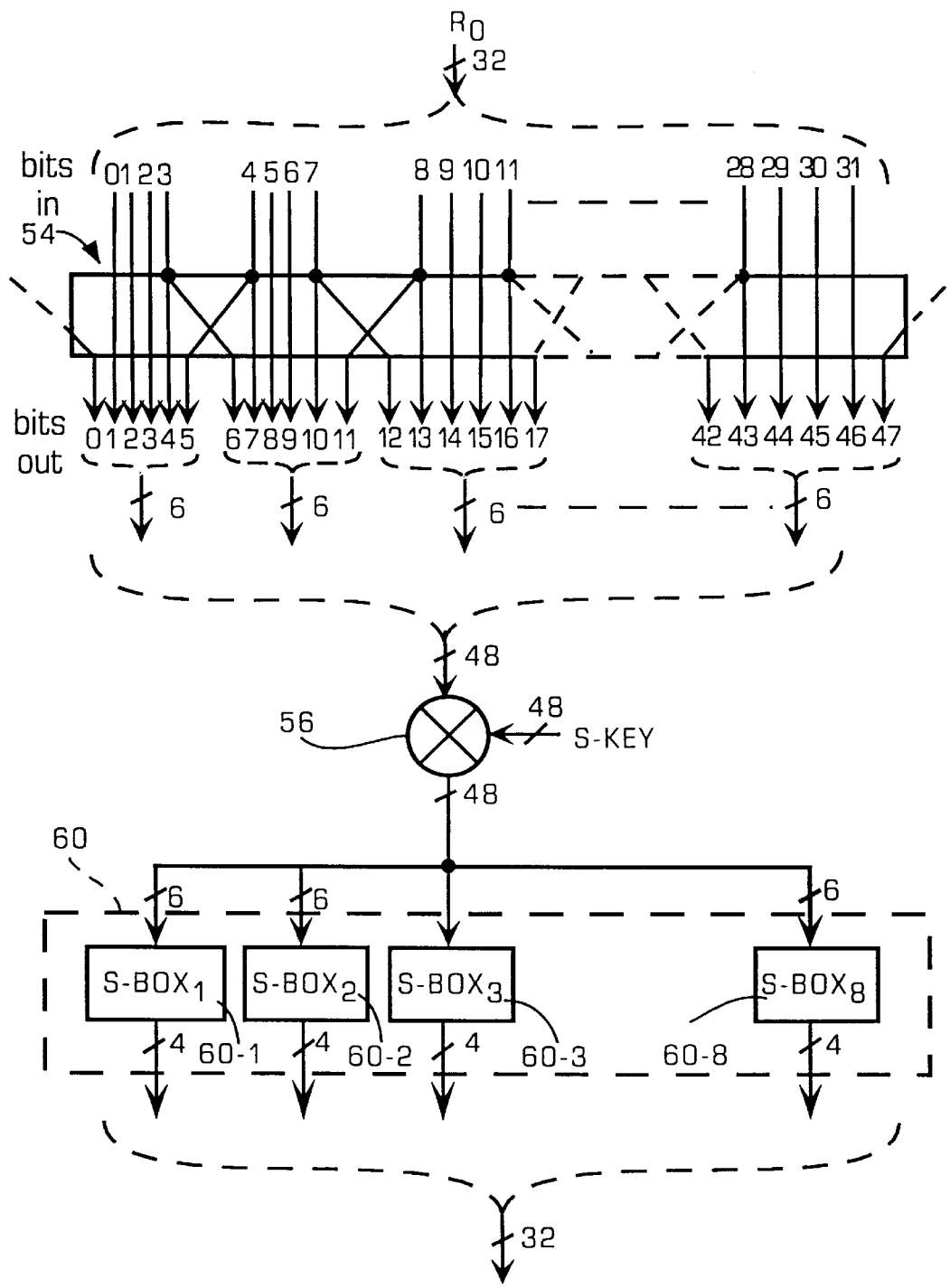
FIG. 5 is a block diagram illustrating an expansion operation and S-box operation of DES.

FIG. 5 illustrates the expansion operation 54 and the S-box operation 60 of FIG. 3. As shown, the input bits to the expansion device 54 from the 32-bit right half $R_O$ of the input 64-bit block (FIG. 3, 50) are operated on as eight groups of 4 bits. Each group of 4 bits is expanded in an expansion permutation to 6 bits, in the manner illustrated in FIG. 5. Input bits 0–3 in the first group comprise output bits 1–4, respectively. Output bit 0 is derived from input bit 31 as indicated. Input bits 3 and 4, i.e., the first and last of the first two groups, are used as the extra bits to expand an adjacent group of four bits to six. As indicated in the figure, input bit 3, in addition to being output bit 4, also forms output bit 6, and input bit 4 forms both output bits 5 and 7. Similarly, input bit 7 forms output bits 10 and 12, and input bit 8 forms output bits 11 and 13. As a result of these operations, the output of expansion device 54 comprises eight groups of six bits, for a total of 48 bits. This bit manipulation process lends itself also to a hardwired hardware implementation.

The 48 bits from the expander are then combined with a sub-key in an XOR 56, as previously explained. The 48-bit output from the XOR is divided into eight groups of 6 bits, and each group is supplied to one of eight S-boxes 60-1 to 60-8. Each S-box substitutes four output bits for six input bits. Each S-box may constitute a table of four rows and sixteen columns which uses the six input bits as address entries into a corresponding table. The table entry corresponding to the address is then output from the table as 4 bits. The eight groups of 4 bits are combined to form a 32-bit word which is then supplied to the permutation stage 62 (FIG. 3).

IDEA is another block cipher process which may be advantageously implemented using the invention. This process, which uses a 128-bit key, diffuses a 64-bit block of plaintext into multiple portions and confuses the bits within each portion and between portions by mixing operations on the portions from different algebraic groups such as exclusive-OR, addition and multiplication. It does not use permutation as does DES.

As seen from the foregoing, an encryption process such as DES comprises operations which involve data movement, bit manipulation (substitution and transposition), table look-up/memory addressing, Boolean operations such as exclusive-OR, and recursive or iterative operations. As will be described, the invention performs these operations and functions in a manner which optimizes the overall data security function to the requirements of specific applications to provide high performance, cost-effectiveness, flexibility and scaleability. More particularly, the invention provides a unique integrated systems approach which matches flexible programmable hardware elements with microprocessors in an optimum way and allocates the constituent operations of a data security process to achieve optimum system performance and cost effectiveness for a given application in a manner which was heretofore unavailable.

Figure 6:
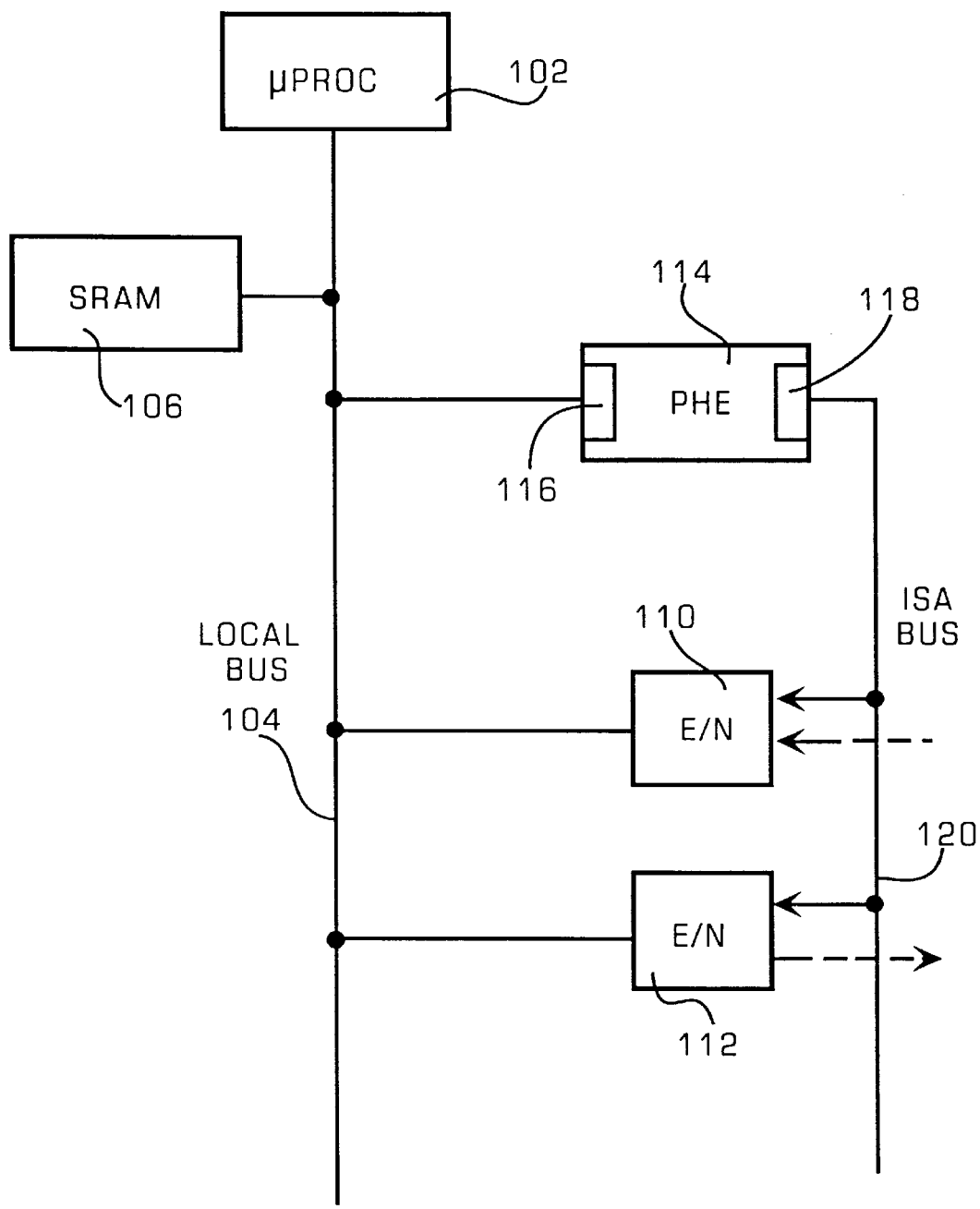
FIG. 6 is a block diagram of a data security system in accordance with a first embodiment of the invention.

FIG. 6 is a block diagram of an integrated hardware/software data security system 100 in accordance with the first embodiment of the invention. As shown, system 100 may comprise a microprocessor 102 which provides a 32-bit Local Bus 104 for data. A SRAM 106 may be connected to Local Bus 104 for storing data temporarily during processing operations. I/O devices, such as ethernet (E/N) adapters 110, 112 are connected to the Local Bus and provide a duplex communications interface to a network for data flow into and out of the processing system. The system also has a programmable hardware element (PHE) 114 which is interfaced to Local Bus 104 by a Local Bus interface 116 which is part of the PHE. PHE 114 also provides a second bus interface 118 for an Industry Standard Architecture (ISA) bus 120. The ISA bus 120 is a 16-bit, 8 Mhz asynchronous control bus which controls ethernet adapters 110 and 112, and may also control SRAM 106 and other devices (not illustrated) connected to the Local Bus. The Local Bus is a 32-bit synchronous data and control bus and, in a preferred embodiment the microprocessor 102 may be a 32-bit Intel 960 JF microprocessor having a 33 Mhz Local Bus interface. PHE 114 may also control the microprocessor via the Local Bus in order to provide a Local Bus data rate which is compatible with the data rate of the ethernet adapters 110 and 112 upon data being input to or output from the system. This permits use of slower, less costly E/N adapters such as 16-bit adapters to be used with a higher speed 32-bit Local Bus that enhances data security processing performance. PHE 114 may also perform communications network functions, such as internet protocol (IP) checksum operation.

Figure 7:
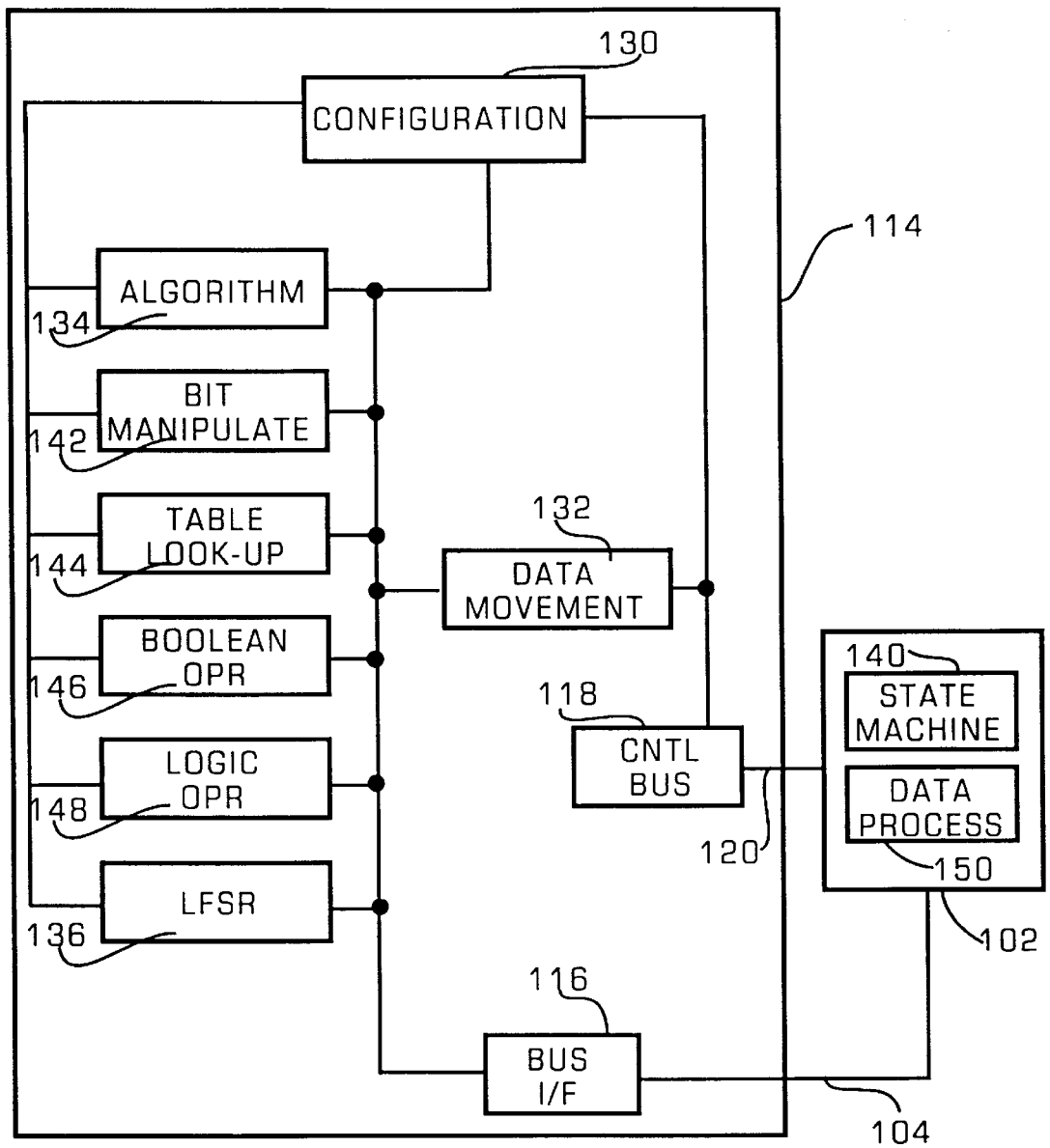
FIG. 7 is functional block diagram illustrating in more detail a programmable hardware element in accordance with the invention.

PHE 114 is preferably a field programmable logic device, such as a field programmable gate array (FPGA), a programmable logic device (PLD), etc., depending upon the particular functions and operations which it is to perform. Such devices are commercially available, and preferred devices are the Xilink XC 5200 Series or XC 4000 Series FPGAs. The 5200 Series FPGAs comprise arrays of configurable logic blocks comprising gates and functional elements, including logic, multiplexers, flip-flops, memory elements and indirectly addressable SRAM. The 4000 Series FPGAs also comprise configurable logic blocks and include directly addressable dual port memory. Both devices have a general routing matrix which allows interconnection of functional blocks within the device, as well as interconnection of gates to form Boolean logic functions such as AND, OR, XOR, etc. These devices are highly flexible, and are programmable to perform a number of the functions and operations for data security, and are reconfigurable so that their functions and operations may be changed. Moreover, they may be tailored to a particular processor and to a particular bus, rather than merely providing a generic bus interface as is true of DES chips. PHE 114 may be configured to be an extension of the processor itself, rather than being merely a peripheral or I/O chip. It operates at the Local Bus speed (33 Mhz) and provides a 32-bit interface, for example, to match 32-bit processors which is particularly convenient for data encryption and decryption on 64-bit blocks. The PHE can operate at the microprocessor speed, 33 Mhz, and acts much like a memory element rather than as a slower peripheral device. Moreover, the PHE is configured to take advantage of certain addressing modes of the processor which normal peripherals cannot support, such as the bursting mode. This is particularly convenient since one address may be followed by up to four data fetches, which provide significantly enhanced data processing speed over a peripheral chip that does not support bursting operation but requires a separate address for each data fetch. The most significant aspect of the PHE in terms of enhanced processing performance, however, is the ability it affords to significantly accelerate certain portions of the symmetric block encryption process, as well as for performing certain operations such as hashing for public key cryptography, and hardware based random bit or number generation. FIG. 7 illustrates this in more detail.

FIG. 7 is a functional block diagram which illustrates the functionality which may be embodied in the PHE 114 and shows its cooperation with the microprocessor. As indicated above, the PHE may comprise an array of configurable logic blocks which may be configured and interconnected to perform desired functions and operations. The actual hardware configuration of the logic blocks within the PHE 114 are controlled by the processor and stored in a non-volatile configuration memory 130 which may be loaded with configuration information by microprocessor 102 upon start-up. The general routing matrix uses the configuration information to configure the PHE to provide a Local Bus interface 116 to interface to bus 104 as well as an ISA control bus interface 118 to interface to ISA bus 120 (FIG. 6). In addition, the PHE may be configured to perform data movement functions 132, predetermined algorithms 134, such as DES or a hashing operation required for public key cryptography and other operations such as data compression. PHE 114 may also be configured to include a linear feedback shift register (LFSR) 136 for random bit and number generation.

Referring to FIGS. 2A–B, the PHE may be configured to perform the entire DES ECB operation 30, with the processor supplying the plaintext data $D_x$ to the PHE, and receiving the $C_x$ output and performing the exclusive OR operation 40 to provide the output block of ciphered text $C_i$. Microprocessor 102 may be programmed to perform a state machine function 140 (FIG. 7) to control the overall operation of the PHE such as controlling the number of iterations and keeping track of the DES round. In addition, the PHE may perform bit manipulation functions 142 (FIG. 7) such as the permutations, table look-up and addressing functions 144 (FIG. 7) for substitution operations, Boolean operations 146 (FIG. 7) and logic operations 148 (FIG. 7). Of particular importance to a DES data security process is the ability of the PHE to efficiently manipulate bits. As previously described, the initial permutation and final permutation of DES involve a transposition of 64 bits in a block of data. Moving bits around in a microprocessor using software is a very expensive (in processing power) and time-consuming operation. This is because it is necessary to move data both between registers as well as to move the individual bits within a register. Implementation of a DES initial or final permutation in software using a 32-bit Pentium microprocessor operating at 133 Mhz requires approximately 42 logical operations, and each permutation takes approximately 2.5 microseconds. In contrast, with the same processor, the 16 DES rounds in total require only approximately 9 microseconds. Thus, the initial and final permutations alone take approximately ⅓ of the total time required for one complete DES ECB operation. In contrast, bit manipulation in hardware is very fast. The PHE can perform the initial and final permutation in one operation using hard wired registers 70 and 72 (See FIG. 4) which are interconnected to provide the required permutation 74. Likewise, the expansion operation 54 (FIG. 5) and permutation operation 62 (FIG. 3) of DES are bit manipulation functions which are conveniently performed in hardware by the PHE. The S-box operation 60 (FIG. 3), which comprises a table look-up function is also preferably done by the PHE.

The microprocessor 102 (FIG. 7), on the other hand, is very efficient at data processing operations 150, such as data structure or flow analysis, as well as performing the state machine functions to keep track of the operating state and controlling the PHE. These functions are inefficient to implement in hardware. In addition, for lower cost systems, the microprocessor may generate the sub keys required for a DES operation, and supply them to the PHE via the bus interface 132.

By allocating the functions which lend themselves to hardware such as the bus interfaces, bit manipulation, the S-box look-ups, etc., to the PHE, and allocating those functions which lend themselves to software operation, such as data processing, data structure or flow analysis and overall program control to the processor 102, a substantial increase in performance is obtained over a software implementation of DES and a substantial decrease in costs for the same or higher performance is obtained over hardware implementations using special purpose-chips or custom ASICs. To illustrate this, a Pentium 133 Mhz microprocessor performing a DES operation in software has an effective encryption rate of the order of 12 Mbps. In contrast, the system 100 of FIG. 6 employing an Intel 960JF microprocessor operating at 33 Mhz and a Xilink 5200 series FPGA achieve an effective data encryption rate of the order of 30 Mbps at less than one-half the cost of the software approach. Using the Intel 960JF microprocessor and software to perform the DES operation affords a data encryption rate of only about 3 Mbps.

Figure 8:
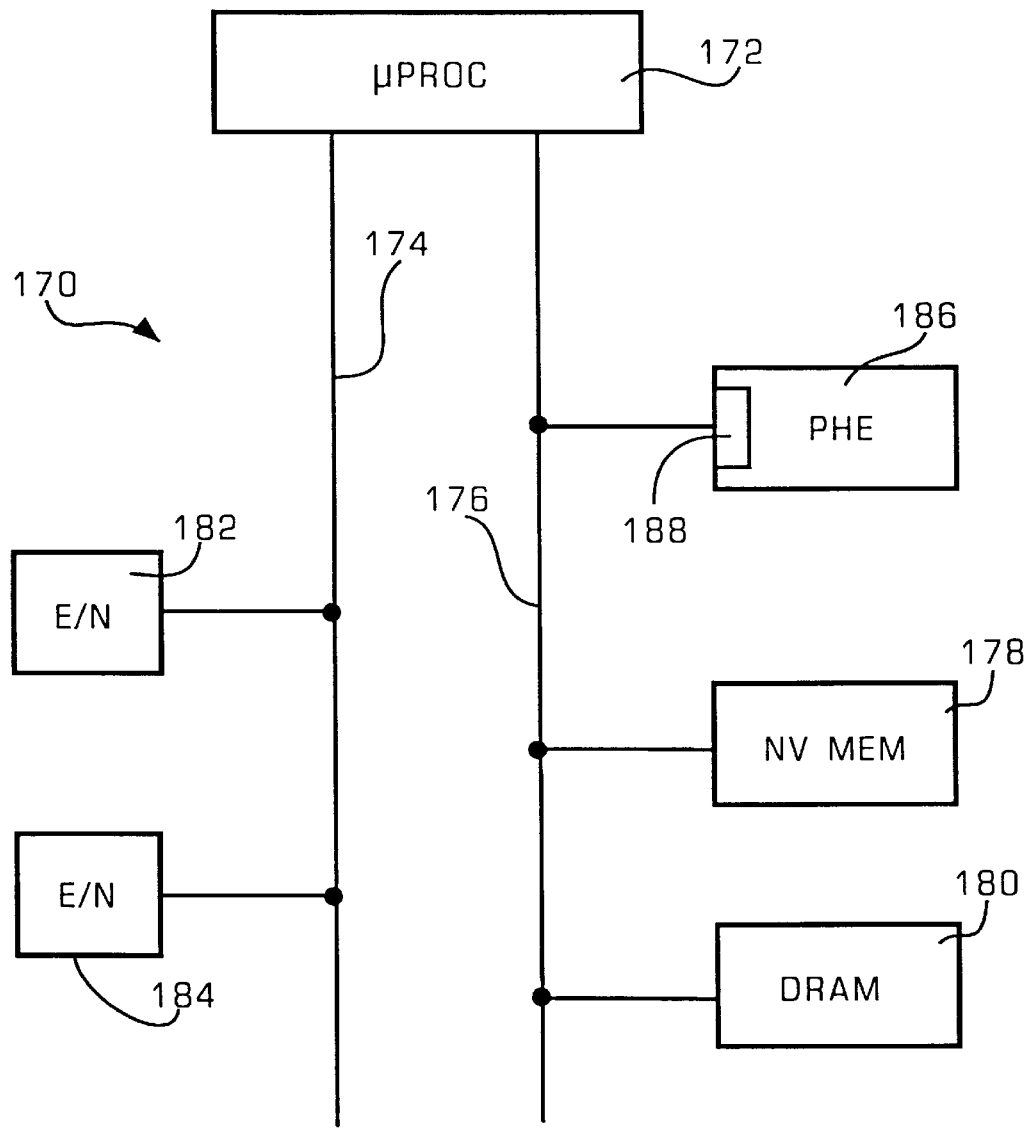
FIG. 8 is a block diagram of a data security system in accordance with a second embodiment of the invention.

FIG. 8 illustrates a second embodiment of a data security processing system 170 in accordance with the invention. As shown, system 170 may comprise a microprocessor 172 which provides both an industry standard 32-bit PCI Bus 174 and a 32-bit Local Bus 176. A non-volatile memory 178 and a DRAM 180 may be interfaced to the Local Bus, and a pair of I/O devices such as ethernet adapters 182 and 184 may be interfaced to the PCI Bus 174 to provide a data communications interface to a network for inputting and outputting data. The ethernet adapters may be full 32-bit adapters to match PCI Bus 174. System 170 also has a programmable hardware element PHE 186 which may be interfaced to Local Bus 186 by a bus interface 188. PHE 186 may be substantially similar to PHE 114, and may be similarly programmed to perform a DES ECB operation, with the exclusive-OR function of cipher block chaining operation being performed by the microprocessor. Microprocessor 172 may, for example, be an Intel 960 RP microprocessor, which is in the same family as processor 102 of FIG. 6.

An advantage of system 170 over system 100 of FIG. 6 is that by interfacing the ethernet adapters to a separate PCI Bus, there is no necessity to slow down the higher speed Local Bus 176 for I/O operations, or to interrupt the data exchange among the elements interfaced to the higher speed Local Bus and the microprocessor. This affords higher performance data processing for data security operations, while enabling the I/O adapters to be tailored to the data communications network and the needs of the processing system.

As in system 100 of FIG. 6, those operations which lend themselves to hardware and are more efficient in hardware are allocated to the PHE 186. These include the bit manipulation functions required for the permutation and expansion operations, and the substitution function of the S-boxes. The data processing and state machine functions which are more efficiently performed in the microprocessor are allocated to microprocessor 172. The microprocessor, for example, is very efficient at determining which round of DES is in process and at executing a FOR loop to iterate the DES operations for 16 DES rounds. The PHE is analogous to a floating point co-processor, which is tuned to and cooperates optimally with the microprocessor to perform the DES operations. With a 10 Mbps I/O ethernet data rate, the actual data rate in the PHE is of the order of 48 Mbps. The data rate of memory buffer to memory buffer, that is moving data out of one buffer, moving it through the PHE, and back into another buffer is in excess of 20 Mbps.

Another advantage of the invention is that the PHE may be implemented with two (or more) channels of DES processing, with the data into the two channels phased such that a second process begins when a first process is partially completed. This corresponds, for example, to an ECB operation being performed on $D_O$ (See FIG. 2B) and a second ECB operation being started on data block $D_1$ when the first ECB operation is approximately one-half finished, for example. This ensures that the cipher block output $C_0$ is available for being combined with the output from the second ECB when it is needed. In this manner, the effective overall data rate can be doubled over a single channel approach. Furthermore, performance may be enhanced by tuning the hardware to minimize the effects of the longest delay in an operation. This can be accomplished by either shortening the delay or by timing such that its effects are minimized, as for example, by looking at the logic to determine which have the longest delays, and optimizing them to reduce these delays. In addition to phasing the two channels such that one is 180° (or 8 DES rounds) out of phase with the first one, it is also possible to duplicate the hardware elements within the PHE so that it comprises two separate and independent channels. One channel could then operate on one data stream and the other could operate independently on a second data stream. In effect, two separate DES operations can be performed in one PHE, with the aggregate performance being the performance of the equivalent of two separate devices.

From a cost standpoint, FPGAs are a very cost-effective approach to implementing in hardware those hardware-centric operations of DES because as the size of the FPGA is doubled, four times the number of functional blocks are obtained within the FPGA. Doubling the cost of an FPGA results in approximately four times the area. Doubling the size and the amount of hardware in an FPGA in order to provide two separate channels is only about a one-third differential in cost, not double the cost. It is important for optimizing the performance of an integrated hardware and software data processing system of the invention employing a microprocessor and a programmable hardware elements to parse the process to be performed into its functional operations, and allocate those operations that are more efficiently performed in software to the microprocessor and those which are more efficiently performed in hardware to the PHE. This enables use of a less costly microprocessor, while maintaining a high overall data rate, since the microprocessor need not be tasked with the more computationaly intensive functions. This is possible because the hardware in a PHE is relatively inexpensive, and significant performance can be obtained by employing more hardware rather than a more powerful processor.

Figure 9:
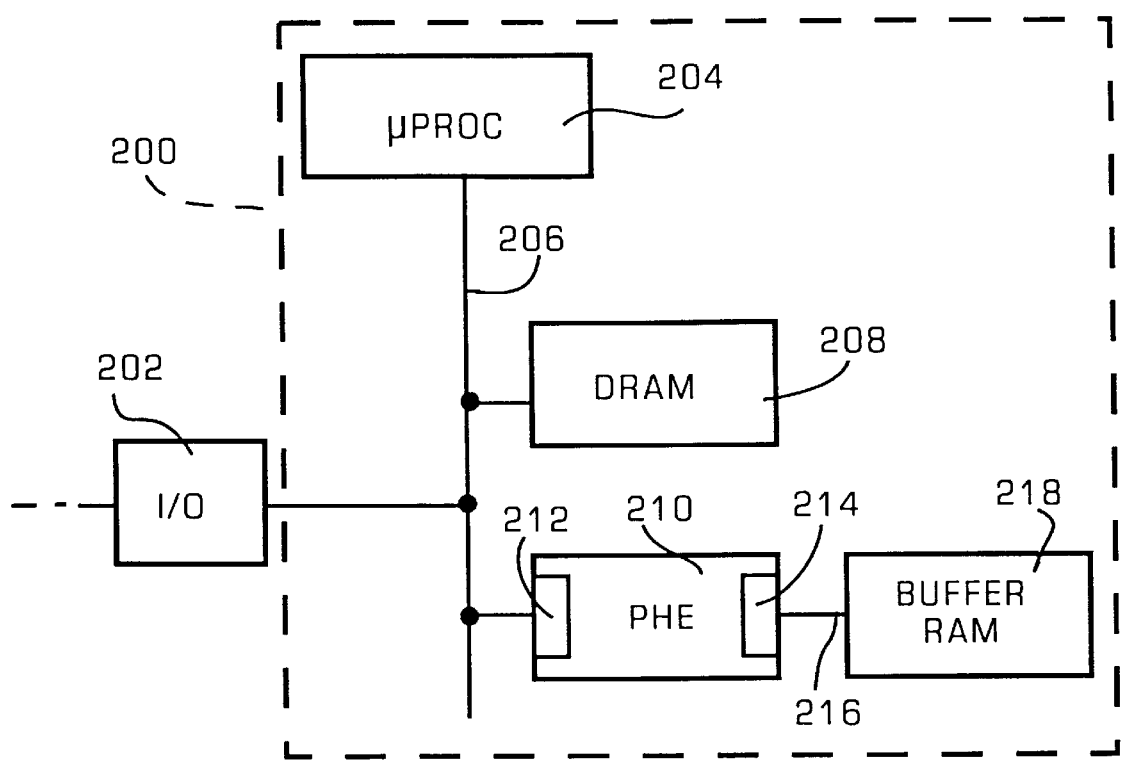
FIG. 9 is a block diagram of a data security system in accordance with a third embodiment of the invention.

FIG. 9 is a block diagram of another integrated hardware/software data processing system 200 for performing data security and for interfacing to an I/O device 202, such as a high-speed 155 Mbps ATM data communications network adapter. As shown, the system may comprise a microprocessor 204 having a high speed memory bus 206 to which is interfaced a DRAM 208 and to a PHE 210. The PHE may have a bus interface 212 to interface the PHE to bus 206, and have a second bus interface 214 for interfacing to another high-speed bus 216 to a buffer RAM 218. The PHE employs the buffer RAM for temporary storage of data during data processing operations, and the high-speed bus 216 permits high data transfer rates at memory speed between the buffer RAM and the PHE without the necessity of transfers over processor bus 206. Moreover, the architecture decouples the buffer RAM from the processor bus 206 so that the microprocessor can perform other functions simultaneously with the data security function.

The processing system 200 of FIG. 9 is particularly well adapted for managing one independent input or output channel of high-speed data, and I/O device may be either an input or an output device. In system 200, the microprocessor instructs the PHE to execute DES operations and to transfer data back and forth to RAM 218. In this situation, the PHE would also be responsible for all data movement 132 (FIG. 7) between the buffer RAM 218 and the PHE 210. Thus, the data transfers associated with the data security function occur between the PHE and the buffer RAM. Upon completion of the data security processing operation, the processor can then transmit the data out over bus 206. Since the data only transitions the processor bus 206 twice, the maximum affective data rate is twice the performance of traditional systems as described in FIG. 1. The coupling between the PHE and the RAM can be very fast and can operate at the RAM speed, rather than at the slower speed of the bus 206. For example, typical RAM used for processor caches may operate at 15 nanoseconds or faster, while typical processor DRAM operates at 60 nanoseconds.

Figure 10:
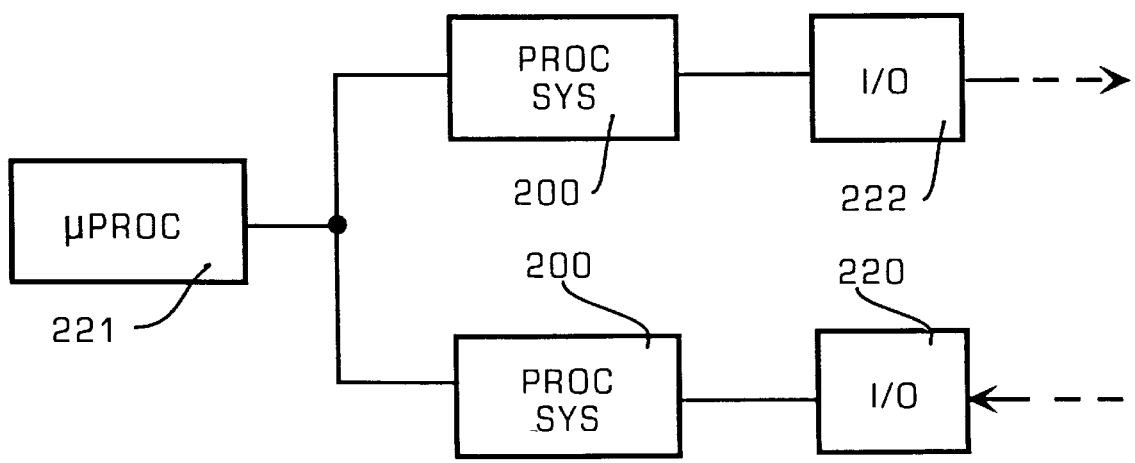
FIG. 10 is a block diagram of a data communication system incorporating the data security system of FIG. 9.

Processing system 200 is well adapted to be used as one channel in a two-channel duplex processing system such as illustrated in FIG. 10. As shown, a first processing system 200 may be interfaced with a first I/O adapter 202, such as an ATM 155 Mbps adapter for outputting data to a network, and a second processing system 200 may interface with a second I/O ATM adapter 220 for handling input data from the communications network. The two processors may be connected to operate in parallel and to be controlled by a microprocessor 221. The bus connections between microprocessor 221 to processing systems 100 and to the I/O adapters may be a PCI Bus. Microprocessor 221 does not have to be a particularly high powered processor in order to provide a high performance data security system. Microprocessor 221 may perform overhead functions to control the two processing systems. It may be a server, for example, that interfaces a private network (not shown) to a high speed ATM network. The microprocessor may execute public key functions, either alone or in combination with one or both of the processing systems 200 to perform a key exchange operation to agree upon a particular session key and supply that session key to the appropriate one of the processing systems. In this manner, microprocessor 221 can manage two different simultaneous data security processing operations being performed using two separate keys. As before, each processing system 200 may perform a DES data security operation by allocating the various functions and operations between the microprocessor 204 and the PHE 210 (FIG. 9). Alternatively, the PHE could perform not only the entire DES ECB operation, but also the cipher block chaining operation using an initial vector and subkeys provided by the microprocessor.

From the foregoing, it will be appreciated that the invention provides a highly flexible, adaptable, and scalable integrated data processing system for data security that can be tailored to a particular application to provide an appropriate level of performance and cost-effectiveness. Typical Internet customers may only have a T1 or a frame relay system, and may only require data rates of the order of 3 to 4 Mbps. Larger customers, such as Fortune 500 corporations, may have multiple T1's and/or T3's to the Internet, and a remote office may have more than one T1. A remote office with only 20 to 30 people may not need 10 Mbps, but only 4 Mbps. A large customer, like a central office, which has multiple T3 trunks, may have a need for 100 Mbps or ATM performance at 155 Mbps. In contrast, corporate home subscribers and corporate customers may require considerably less data rate, such as ISDN at 128 Kbps. The invention is highly scalable to meet all of these various requirements using the appropriate combination of microprocessor and PHE, and the appropriate allocation of functions between the microprocessor and the PHE.

This approach is also adaptable to processing operations other than data security, e.g., data compression. Operations, such as signal processing, employing fast Fourier transforms which require exponentiation are very inefficient when done in hardware. It is much more efficient to do such operations in software, e.g., with a Digital Signal Processor device. Accordingly, it would be appropriate to allocate such arithmetic operations to the microprocessor to perform, rather than having them done in the hardware PHE. Similarly, bit manipulation operations and table look-ups are very efficient in hardware, unless the table look-up varies constantly. In this case, it is not the same table, since the data is changing, and it may be more efficient to perform such operations in software. In table look-ups, if it would be necessary to use a RAM to implement the table, and it cannot be done one-time during system installation, it is better done in software than in hardware. On the other hand, if the table is static or key dependant, such as in the S-box operation of DES or other algorithms, then it is more efficient to implement such table look-ups in hardware.

While the foregoing has been with respect to certain preferred embodiments of the invention, it will be appreciated by those skilled in the art that changes may be made to these embodiments without departing from the principles and the spirit of the invention, the scope of which is defined by the appended claims.

What is claimed is:

1. A data security system for performing a cryptographic process on data represented by bits, the cryptographic process comprising a predetermined repetitive sequence of steps which include bit manipulation operations comprising permutations of bits and substitutions of bits and logical operations, the system comprising a microprocessor; a programmable hardware device connected to the microprocessor, the programmable hardware device comprising a plurality of elements connectable together under program control in different configurations of elements for performing different functions, the elements being connected to perform said bit manipulation and logical operations of said cryptographic processes; program means within the microprocessor for moving data to and from the hardware device and for controlling the hardware device to repetitively perform said bit manipulation and logical operations in accordance with said predetermined sequence of steps so as to perform said cryptographic process; and means for loading configuration information into the hardware device from the microprocessor upon start-up of the system to connect the elements to perform said operations.

2. The data security system of claim 1, wherein said cryptographic process comprises a predetermined number of iterations of said predetermined sequence of steps, and wherein said program means comprises means for controlling the hardware device to repeat said sequence of steps for the predetermined number of times.

3. The system of claim 1, wherein said programmable hardware device comprises a field programmable gate array, and said elements comprise logic blocks interconnectable to configure the elements for performing said bit manipulation and logical operations.

4. The system of claim 1, wherein said cryptographic process comprises the Data Encryption Algorithm in which said predetermined sequence of steps is iterated for a predetermined number of rounds, and wherein said microprocessor comprises means for deriving from a cryptographic key a different sub key for each of said predetermined number of rounds.

5. The system of claim 1, wherein said cryptographic process comprises a block cipher encryption process wherein each predetermined sequence of steps produces a block of ciphertext, and wherein said microprocessor comprises means for combining a block of ciphertext with a previous block of ciphertext to form a modified block of ciphertext, and means for iterating said combining operation as successive blocks of data are input into the system.

6. The system of claim 1 further comprising a buffer RAM connected to the hardware device for the temporary storage of data being processed by the hardware device and the results of said bit manipulation ad logical operations.

7. A data security system for performing a cryptographic process on data represented by bits, the cryptographic process comprising a predetermined sequence of repetitive operations including bit manipulation operations involving movements of different ones of said bits relative to other ones of said bits, and a plurality of data processing and control operations, the system comprising a microprocessor having a bus; a programmable hardware element connected to the microprocessor by the bus, the programmable hardware element comprising a plurality of functional elements connectable together by the microprocessor in different configurations to perform predetermined functions; first program means within the microprocessor for controlling data movement to and from the programmable hardware element over said bus: and second program means for configuring the programmable hardware element such that said programmable hardware element performs said bit manipulation operations and the microprocessor performs said data processing and control operations.

8. The system of claim 7, wherein said bit manipulation operations comprise bit permutation and bit substitution operations, and said data processing and control operations comprise data movement over said bus and controlling the operating state of the programmable hardware element to perform said predetermined sequence of repetitive operations.

9. The system of claim 8, wherein said bit manipulation operations further comprise transposition of bits, and said bit substitution operations comprise memory addressing operations.

10. The system of claim 7, wherein said cryptographic process comprises a block cipher process, and wherein said programmable hardware element comprises means for initially permuting bits of a 64-bit block of data; means for dividing the permutated bits into first and second portions; means for expanding the first portion to increase the number of bits in said portion; means for combining the expanded first portion with a sub key to produce a combined block of data; means for converting said combined block into a substituted block having a smaller number of bits; means for permutating the bits in the substituted block; and means for combining the permutated bits with said second portion of the input block to produce a new first portion.

11. The system of claim 10, wherein said microprocessor has first means for controlling the programmable hardware element to produce a first block of ciphertext; second means for combining said block of ciphertext with a vector to produce a first modified block of ciphertext; third means for controlling the programmable hardware element to produce a second block of ciphertext; and fourth means for combining said second block of ciphertext with said first modified block of ciphertext to produce a second modified block of ciphertext.

12. The system of claim 7, wherein said cryptographic process comprises a block cipher process, and wherein said programmable hardware element comprises means for separating the bits of an input block of data into multiple portions; and means for combining predetermined ones of the bits within each portion and between different portions in response to a key using logic operations.

13. The system of claim 7, wherein said bus is a data bus, and the microprocessor further has a control bus for controlling devices connected to the data bus, and wherein said programmable hardware element has first functional elements configured for interfacing to said data bus and for operating at an operating speed of said data bus; and has second functional elements for interfacing to the control bus for controlling the devices connected to said data bus.

14. The system of claim 7, wherein said programmable hardware element has functional elements configured to generate random bits.

15. The system of claim 7, wherein said programmable hardware element has functional elements configured to perform a network communications function.

16. A method of performing a cryptographic process on data represented by bits in a system comprising a microprocessor and a programmable hardware device having a plurality of elements which are connectable together under program control by the microprocessor to perform predetermined functions, the cryptographic process comprising a predetermined sequence of repetitive operations including bit manipulation operations involving movement of different ones of said bits relative to other ones of said bits and a plurality of different data processing and control operations, the method comprising configuring the elements of the programmable hardware device using the microprocessor to perform said bit manipulation operations; controlling, using said microprocessor, data flow to and from said programmable hardware device; and controlling the programmable hardware device to perform said predetermined repetitive sequence of steps for a predetermined number of iterations in order to perform said cryptographic process, wherein data flow to and from said programmable hardware device is in blocks comprising multiple bits, and wherein said method comprises performing in said programmable hardware device steps comprising permutating bits of a block of data to rearrange the order of the bits; dividing the permutated bits into first and second portions; expanding the first portion to increase a number of bits in such portion; combining the expanded first portion with a sub key from the microprocessor to produce a combined block of data; converting the combined block into a block having a smaller number of bits; permutating the bits in the smaller block; and combining the permutated bits with the second portion of the block to produce a new first portion.

17. The method of claim 16 further comprising providing in a memory tables of stored bits having predetermined values, using the programmable hardware device for addressing the memory to retrieve stored bits, and substituting the retrieved bits for predetermined bits in said data.

18. The method of claim 16, wherein said cryptographic process comprises the Data Encryption Algorithm in which said predetermined sequence of steps is iterated for a predetermined number of rounds, and wherein the method comprises deriving in said microprocessor from a cryptographic key different subkeys for each of said predetermined number of rounds, applying the subkeys to data from said programmable hardware device, and controlling the programmable hardware device to perform said repetitive operations for said predetermined number of rounds.

19. A data security system for performing a cryptographic process on data represented by bits, the cryptographic process comprising a predetermined repetitive sequence of steps which include bit manipulation operations comprising permutations of bits and substitutions of bits and logical operations on groups of bits, the system comprising a microprocessor; a hardware device connected to the microprocessor by a first bus over which data is provided to and from said hardware device, the hardware device comprising a plurality of elements connected to perform said bit manipulation and logical operations of said cryptographic processes; a memory connected to said first bus; means connected to a second bus connected to the microprocessor for inputting and outputting data; means for controlling the inputting and outputting means for the input and output of data to the memory and from the memory to the hardware device; and program means within the microprocessor for moving data to and from the hardware device and for controlling the hardware device to repetitively perform said bit manipulation and logical operations in accordance with said predetermined sequence of steps so as to perform said cryptographic process.

20. A system comprising multiple data security systems for performing a cryptographic process on data represented by bits, the cryptographic process comprising a predetermined repetitive sequence of steps which include bit manipulation operations comprising permutations of bits and substitutions of bits and logical operations on groups of bits, each data security system comprising a microprocessor; a hardware device connected to the microprocessor, the hardware device comprising a plurality of elements connected to perform said bit manipulation and logical operations of said cryptographic processes; and program means within the microprocessor for moving data to and from the hardware device and for controlling the hardware device to repetitively perform said bit manipulation and logical operations in accordance with said predetermined sequence of steps so as to perform said cryptographic process; and the system further comprising a control microprocessor connected to respective ones of the microprocessors of said data security systems for controlling said microprocessors; means for performing public key operations to generate session keys for respective ones of said data security systems; and means for supplying the session keys to the data security systems to afford simultaneous data security microprocessing operations.

* * * * *